(12) United States Patent
Shin et al.

(10) Patent No.: US 9,421,942 B2
(45) Date of Patent: Aug. 23, 2016

(54) AIR BAG APPARATUS FOR VEHICLE

(71) Applicants: HYUNDAI MOTOR COMPANY, Seoul (KR); Kia Motors Corporation, Seoul (KR)

(72) Inventors: Hyo Shub Shin, Seoul (KR); Tae In Kim, Yongin-si (KR); Jae Haeng Yoo, Yongin-si (KR); Chang Hyun Lee, Yongin-si (KR); Jun Yeol Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/673,358

(22) Filed: Mar. 30, 2015

(65) Prior Publication Data

US 2016/0144820 A1     May 26, 2016

(30) Foreign Application Priority Data

Nov. 24, 2014     (KR) ........................ 10-2014-0164591

(51) Int. Cl.
    *B60R 21/233*     (2006.01)
    *B60R 21/239*     (2006.01)
    *B60R 21/274*     (2011.01)
    *B60R 21/2346*     (2011.01)

(52) U.S. Cl.
    CPC ........... *B60R 21/239* (2013.01); *B60R 21/2346* (2013.01); *B60R 21/274* (2013.01); *B60R 2021/2395* (2013.01); *B60R 2021/23308* (2013.01); *B60R 2021/23324* (2013.01)

(58) Field of Classification Search
    CPC ................ B60R 21/233; B60R 21/239; B60R 2021/01034; B60R 2021/23308; B60R 2021/23324; B60R 2021/2395
    See application file for complete search history.

(56) References Cited

U.S. PATENT DOCUMENTS

| 4,262,931 | A | * | 4/1981 | Strasser | ................ B60R 21/233 280/729 |
| 5,529,337 | A | * | 6/1996 | Takeda | .................. B60R 21/233 280/729 |
| 5,586,782 | A | * | 12/1996 | Zimmerman, II | . B60R 21/23138 280/730.2 |
| 5,848,804 | A | * | 12/1998 | White, Jr. | .......... B60R 21/23138 280/730.2 |
| 6,962,363 | B2 | * | 11/2005 | Wang | .................... B60R 21/233 280/729 |

(Continued)

FOREIGN PATENT DOCUMENTS

| JP | 10-81191 A | 3/1998 |
| JP | 2006-088856 A | 4/2006 |

(Continued)

OTHER PUBLICATIONS

Korean Office Action issued in Korean Application No. 10-2014-0164591 dated Feb. 19, 2016.

*Primary Examiner* — Laura Freedman
(74) *Attorney, Agent, or Firm* — McDermott Will & Emery LLP

(57) ABSTRACT

An air bag apparatus for a vehicle includes an inflator and a main tube configured to be unfolded toward an occupant of the vehicle by a gas pressure when the inflator explodes. A support tube is coupled to one side of the main tube and configured to be unfolded by being supplied with gas from the main tube. An active vent is configured to be installed in a path which connects the main tube to the support tube and to open and close the path. A controller is configured to control an opening and closing operation of the active vent.

10 Claims, 3 Drawing Sheets

(56) References Cited

U.S. PATENT DOCUMENTS

| | | | | |
|---|---|---|---|---|
| 7,631,891 B2* | 12/2009 | Washino | ............... | B60R 21/203 280/731 |
| 7,654,561 B2* | 2/2010 | Webber | ................ | B60R 21/233 280/729 |
| 7,686,333 B2* | 3/2010 | Choi | .................... | B60R 21/233 280/736 |
| 8,419,050 B2* | 4/2013 | Yoo | ....................... | B60R 21/233 280/439 |
| 8,500,164 B2* | 8/2013 | Mendez | ................ | B60R 21/205 280/739 |
| 9,150,186 B1* | 10/2015 | Belwafa | ............... | B60R 21/233 |
| 9,162,645 B2* | 10/2015 | Cho | ....................... | B60R 21/205 |
| 9,272,684 B1* | 3/2016 | Keyser | ................ | B60R 21/237 |
| 2015/0069741 A1* | 3/2015 | Shimazu | ................ | B60R 21/18 280/728.3 |
| 2015/0158452 A1* | 6/2015 | Choi | .................... | B60R 21/233 280/732 |
| 2015/0258959 A1* | 9/2015 | Belwafa | ................ | B60R 21/233 280/729 |
| 2015/0298643 A1* | 10/2015 | Schneider | ............ | B60R 21/233 280/729 |
| 2015/0307055 A1* | 10/2015 | Cheng | ................... | B60R 21/203 280/728.3 |
| 2015/0307056 A1* | 10/2015 | Cheng | ................... | B60R 21/231 280/729 |
| 2015/0336532 A1* | 11/2015 | Lee | ....................... | B60R 21/239 280/729 |
| 2016/0046254 A1* | 2/2016 | Yamada | ................ | B60R 21/233 280/729 |
| 2016/0046257 A1* | 2/2016 | Yamada | .............. | B60R 21/2338 280/729 |

FOREIGN PATENT DOCUMENTS

| | | | |
|---|---|---|---|
| JP | WO 2007069064 A2 * | 6/2007 | ............ B60R 21/233 |
| KR | 10-2009-0117462 A | 11/2009 | |
| KR | 10-2010-0089666 A | 8/2010 | |
| KR | 10-2011-0064821 A | 6/2011 | |
| KR | 10-2012-0011724 A | 2/2012 | |

\* cited by examiner

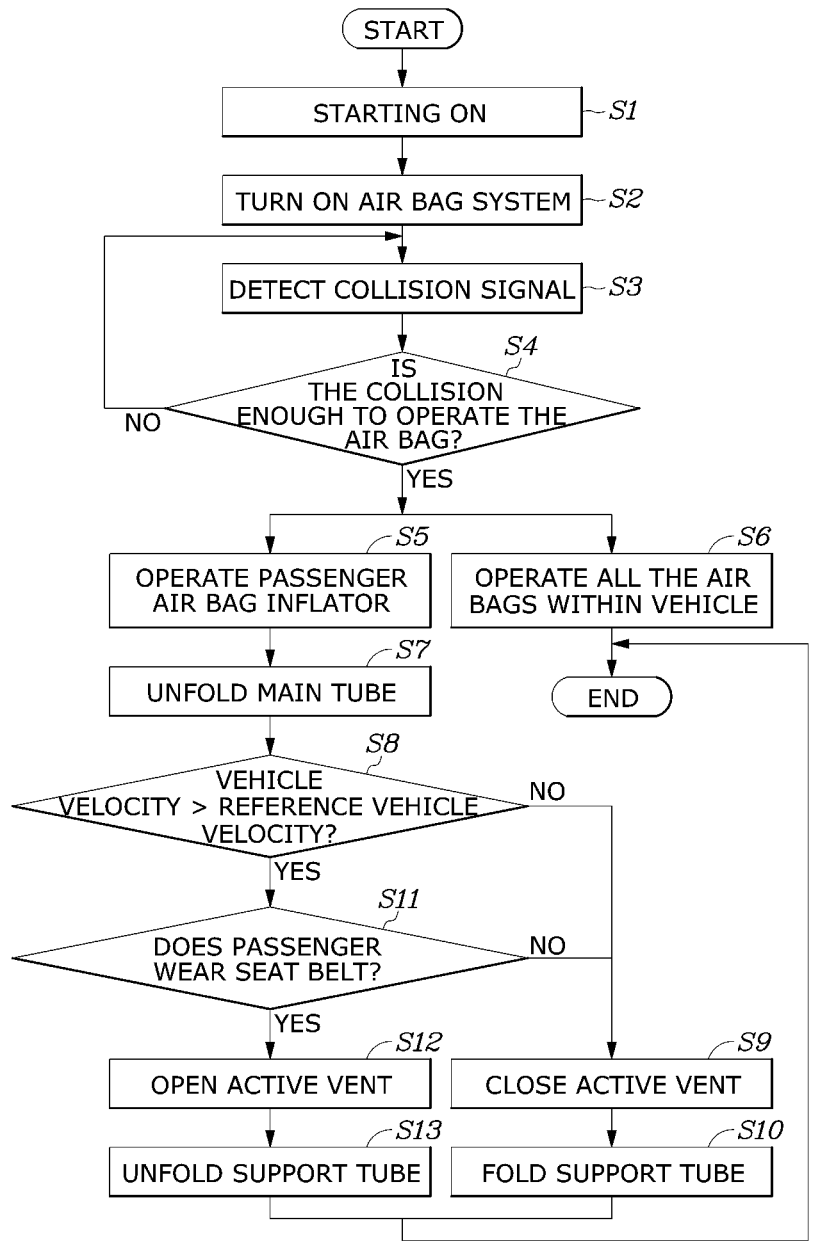

AIR BAG APPARATUS FOR VEHICLE

CROSS REFERENCE TO RELATED APPLICATION

The present application claims priority to Korean Patent Application No. 10-2014-0164591, filed Nov. 24, 2014, the entire contents of which is incorporated herein for all purposes by this reference.

TECHNICAL FIELD

The present disclosure relates to an air bag apparatus for a vehicle, and more particularly, to a technology of an air bag apparatus for a vehicle for more effectively protecting safety of an occupant of the vehicle using a main tube and a support tube which is connected to a main tube at the time of a new frontal research moving deformable barrier collision.

BACKGROUND

Car makers have developed and sold a vehicle which meets a small overlap collision test hosted by the insurance institute for highway safety (IIHS) to ensure overseas sales network.

The small overlap collision test of the IIHS has been conducted under the conditions of vehicle velocity: 64 km/h, angle: 0° front, offset amount: 25%, and barrier: rigid pillar. Henceforth, vehicles need to meet a new frontal research moving deformable barrier test for more reflecting safety of passengers.

The new frontal research moving deformable barrier test has been conducted under the conditions of vehicle velocity: 90.1 km/h, angle: 15° inclination, offset amount: 35%, and barrier: research moving deformable barrier (RMDB) and comparing with the current small overlap collision test, vehicle velocity and a weight of a barrier are very severe and therefore a method for ensuring safety of vehicle passengers, has been emerged as an urgent issue.

That is, at the time of the new frontal research moving deformable barrier collision, a passenger's upper body is turned to a direction (driver's seat direction) in which an offset collision occurs as illustrated in FIG. 1. Only a general passenger air bag tube 1 which is currently being used may not effectively protect a passenger's head 2 and therefore the passenger's head collides with a crush pad and thus may be seriously hurt.

The contents described as the related art have been provided only for assisting in the understanding for the background of the present invention and should not be considered as corresponding to the related art known to those skilled in the art.

SUMMARY

The present disclosure relates to an air bag apparatus for a vehicle which is proposed to effectively cope with a new frontal research moving deformable barrier collision, and an object of the present disclosure is to provide an air bag apparatus for a vehicle which may more effectively protect safety of an occupant of the vehicle by controlling whether a support tube is unfolded.

According to an exemplary embodiment of the present inventive concept, there is provided an air bag apparatus for a vehicle, including an inflator and a main tube configured to be unfolded toward an occupant of the vehicle by a gas pressure when the inflator explodes. a support tube is coupled to one side of the main tube and is configured to be unfolded by being supplied with gas from the main tube. An active vent is configured to be installed in a path which connects the main tube to the support tube and to open and close the path. A controller is configured to control an opening and closing operation of the active vent.

The occupant of the vehicle may be a passenger. The support tube may be coupled to one side of the main tube in a first direction from the passenger's seat to a driver's seat, and the support tube may unfold toward the driver's seat when the active vent is opened.

In certain embodiments, the opening and closing operation of the active vent may depend on the velocity of the vehicle. In certain embodiments, the opening and closing operation of the active vent may depend on whether or not the occupant wears a seat belt while the main tube is unfolded.

The controller may control the active vent not to open when the vehicle velocity is equal to or less than a reference vehicle velocity when the main tube is unfolded. In certain embodiments, when the vehicle velocity is equal to or less than the reference vehicle velocity, the controller may control the active vent not to open whether or not the occupant wears the seat belt.

The controller may control the active vent not to open when the occupant does not wear a seat belt when the main tube is unfolded. In certain embodiments, when the occupant does not wear a seat belt when the main tube is unfolded, the controller may control the active vent not to open even when the vehicle velocity is equal to or more than the reference vehicle velocity.

The controller may control the active vent so as to be opened under the situation that the occupant wears a seat belt when the main tube is unfolded. In certain embodiments, when the occupant wears a seat belt when the main tube is unfolded, the controller may control the active vent to open when the vehicle velocity is equal to or more than the reference vehicle velocity.

The controller may be an air bag control unit and the air bag control unit may control all the air bags within the vehicle to be simultaneously deployed when the main tube is unfolded.

BRIEF DESCRIPTION OF THE DRAWINGS

The above and other objects, features and advantages of the present invention will be more clearly understood from the following detailed description taken in conjunction with the accompanying drawings, in which:

FIGS. 2 and 3 are views illustrating an air bag apparatus according to an exemplary embodiment of the present invention for coping with a new frontal research moving deformable barrier collision, in which FIG. 2 is a view illustrating a state in which only a main tube is unfolded and a support tube is folded and FIG. 3 is a view illustrating a state in which the support tube is unfolded, along with the main tube; and FIG. 4 is a flow chart for describing a control of the air bag apparatus according to the exemplary embodiment of the present invention.

DETAILED DESCRIPTION

Hereinafter, an air bag apparatus for a vehicle according to exemplary embodiments of the present inventive concept will be described with reference to the accompanying drawings.

Figure 1:
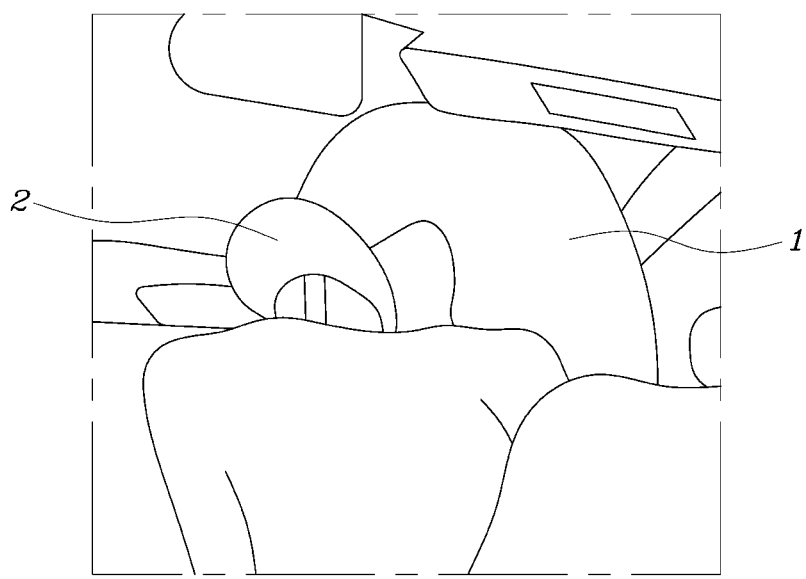
FIG. 1 is a view illustrating a behavior of a passenger at the time of a new frontal research moving deformable barrier collision in a vehicle in which the existing air bag tube is equipped.
Figure 2:
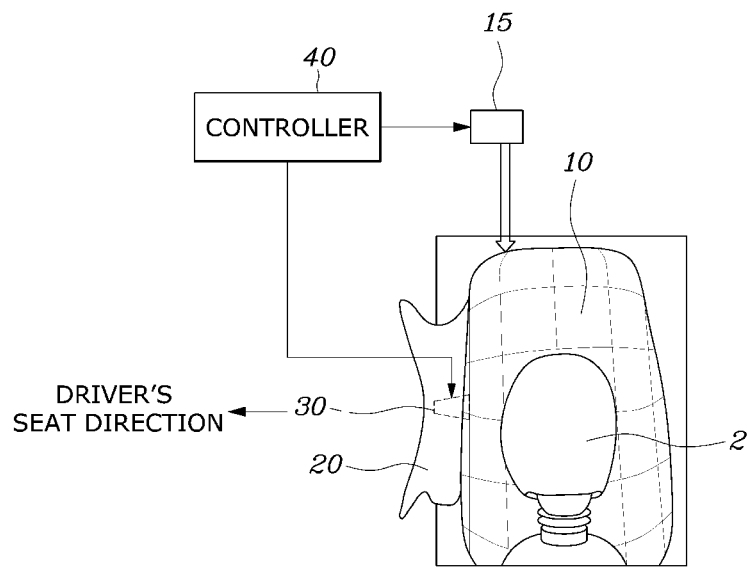
Figure 3:
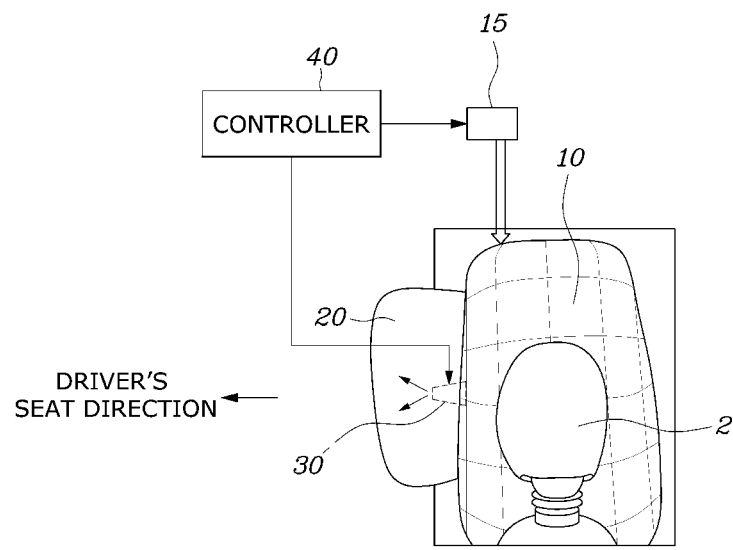

As illustrated in FIGS. 2 to 4, the air bag apparatus for a vehicle according to the exemplary embodiment of the present invention includes a main tube 10 configured to be unfolded toward an occupant of the vehicle by a gas pressure at the time of an explosion of an inflator 15, a support tube 20 configured to be unfolded by being supplied with gas from the main tube 10 while being coupled with one side of the main tube 10, an active vent 30 configured to be installed in a path which connects the main tube 10 to the support tube 20 to open and close the path, and a controller 40 configured to control an opening and closing operation of the active vent 30 depending on a vehicle velocity and whether an occupant wears a seat belt when the main tube 10 is unfolded.

In certain embodiments, the controller 40 controls whether the inflator 15 of the air bag apparatus is operated by receiving a signal from sensors which are equipped in the vehicle. As the sensors, there are a collision sensor detecting an offset collision, a vehicle velocity sensor, a roll over sensor of the controller, a camera, and the like.

Further, in certain embodiments, the controller 40 is configured to receive a signal from a seat belt sensor detecting whether an occupant of the vehicle wears a seat belt to control an opening and closing operation of the active vent 30.

In certain embodiments, the support tube 20 is configured to be coupled with one side of the main tube 10 in a first direction from the passenger's seat to a driver's seat and is configured to be unfolded toward the driver's seat by being supplied with a gas pressure from within the main tube 10 when the active vent 30 is opened.

The reason of unfolding the support tube 20 in the first direction is to effectively protect a passenger's head 2 when a passenger's upper body is turned to the first direction (driver's seat direction) in which an offset collision occurs at the time of a new frontal research moving deformable barrier collision, thereby preventing a passenger's head from colliding with a crush pad.

In certain embodiments, the controller 40 controls the active vent 30 not to open when a vehicle velocity is equal to or less than a reference vehicle velocity while the main tube 10 is unfolded, independently of whether the occupant wears the seat belt or not when the inflator 15 deploying the air bag apparatus is operated at the time of the offset collision.

That is, even though the new frontal research moving deformable barrier collision is generated at a vehicle velocity which is equal to or less than a reference vehicle velocity (90.1 km/h) corresponding to the new frontal research moving deformable barrier condition, the amount that a passenger's upper body is turned to a driver's seat direction is small, such that the passenger's head is less likely to collide with a crush pad. In this case, only the main tube 10 is unfolded to more effectively protect a passenger's upper body and head.

Further, in certain embodiments, the controller 40 controls the active vent 30 so as not to be opened when the occupant does not wear the seat belt while a vehicle velocity is equal to or more than a reference vehicle velocity while the main tube 10 is unfolded.

That is, the new frontal research moving deformable barrier collision occurs at the vehicle velocity which is equal to or more than the reference vehicle velocity corresponding to the new frontal research moving deformable barrier condition. Here, when the passenger does not wear the seat belt, the passenger's upper body is not turned to the driver's seat direction but moves forward. In this case, only the main tube 10 is unfolded to more effectively protect the passenger's upper body and head.

Further, the controller 40 controls the active vent 30 so as to be opened under the situation that the occupant wears the seat belt while the vehicle velocity is equal to or more than the reference vehicle velocity under the situation that the main tube 10 is unfolded.

That is, the new frontal research moving deformable barrier collision occurs at the vehicle velocity which is equal to or more than the reference vehicle velocity corresponding to the new frontal research moving deformable barrier condition. In this case, when the passenger wears the seat belt, the passenger's upper body is turned to the driver's seat direction by a restriction power of the seat belt and the passenger's head moves toward the crush pad. Therefore, in certain embodiments, the controller 40 controls the active vent 30 to be opened to unfold the support tube 20 along with the main tube 10 and uses the unfolded support tube 20 to more effectively protect the passenger's upper body and head.

Meanwhile, in certain embodiments, the controller 40 is an air bag control unit (ACU) which may control all the air bags within the vehicle to be simultaneously opened at the time of meeting the situation that the main tube 10 is unfolded so as to ensure the safety of all passengers within the vehicle.

Hereinafter, an operation of the exemplary embodiment of the present inventive concept will be described with reference to FIG. 4.

When the sensors which are equipped in the vehicle detect a collision signal for the new frontal research moving deformable barrier (step S3) after the vehicle starts on (step S1) and the air bag system is turned on (step S2), the controller 40 (air bag control unit) determines whether the collision is enough to operate the air bags of the vehicle (step S4) and as the determination result, operates inflators of all the air bag apparatuses (for example, driver's seat air bag, curtain air bag, side air bag, and the like) in the vehicle along with the inflator 15 configuring the passenger air bag apparatus under the situation that the air bag is unfolded (steps S5 and S6).

When the inflator 15 of the passenger air bag apparatus is operated, the main tube 10 is first unfolded toward the passenger seat by the gas pressure at the time of the explosion of the inflator 15 (step S7) and the current vehicle velocity is compared with the reference vehicle velocity (90.1 km/h) corresponding to the new frontal research moving deformable barrier condition under the situation that the main tube 10 is unfolded (step S8).

In this case, if it is determined that the current vehicle velocity is equal to or less than the reference vehicle velocity, the controller 40 controls the active vent so as not to be opened independently of whether the passenger wears the seat belt (signal of the seat belt sensor) (step S9), and as a result, only the main tube 10 is unfolded and the support tube 20 is folded and thus the passenger air bag apparatus protects the passenger using the unfolded main tube 10 (step S10).

Further, if it is determined that the current vehicle velocity is equal to or more than the reference vehicle velocity, the controller 40 determines whether the passenger wears the seat belt (step S11). In this case, the controller 40 controls the active vent 30 not to open under the situation that the passenger does not wear the seat belt (step S9), and as a result, only the main tube 10 is unfolded and the support tube 20 is folded and thus the passenger air bag apparatus protects the passenger using the unfolded main tube 10 (step S10).

Further, if it is determined that the current vehicle velocity is equal to or more than the reference vehicle velocity and the passenger wears the seat belt, the controller 40 controls the active vent 30 to be opened (step S12), and as a result, the main tube 10 and the support tube 20 are simultaneously unfolded and thus the passenger air bag apparatus more effectively protects the passenger using the unfolded support tube 20 (step S13).

As described above, according to the exemplary embodiment of the present invention, the support tube 20 is unfolded toward the driver's seat direction along with the main tube 10 under the situation that the passenger wears the seat belt at the time of the new frontal research moving deformable barrier collision to more effectively protect the passenger's upper body and head using the unfolded support tube 20, thereby more effectively protecting the safety of the passenger.

According to the air bag apparatus for a vehicle in certain embodiments of the present invention, the support tube is unfolded toward the driver's seat direction, along with the main tube when the new frontal research moving deformable barrier collision occurs under the situation that the passenger wears the seat belt and the unfolded support tube may more effectively protect the upper body and the head of the passenger, thereby more effectively protecting the safety of the passenger.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. An air bag apparatus for a vehicle, the apparatus comprising:
    an inflator;
    a main tube configured to be unfolded toward an occupant of the vehicle by a gas pressure when the inflator explodes;
    a support tube coupled to one side of the main tube and configured to be unfolded by being supplied with gas from the main tube;
    an active vent configured to be installed in a path which connects the main tube to the support tube and to open and close the path; and
    a controller configured to control an opening and closing operation of the active vent,
    wherein the opening and closing operation of the active vent depends on whether or not the controller receives a signal from a seat belt sensor that occupant wears a seat belt while the main tube is unfolded.

2. The air bag apparatus of claim 1, wherein the occupant is a passenger, the support tube is coupled to one side of the main tube in a first direction from a passenger's seat to a driver's seat, and
    the support tube unfolds toward the driver's seat when the active vent is opened.

3. The air bag apparatus of claim 1, wherein the opening and closing operation of the active vent depends on a vehicle velocity.

4. The air bag apparatus of claim 1, wherein the controller controls the active vent so as not to open when the controller does not receive the signal from the seat belt sensor that occupant does not wear the seat belt when the main tube is unfolded.

5. The air bag apparatus of claim 4, wherein the controller controls the active vent not to open while a vehicle velocity is equal to or more than a reference vehicle velocity.

6. The air bag apparatus of claim 1, wherein the controller controls the active vent to open when the controller receives the signal from the seat belt sensor that the occupant wears the seat belt while the main tube is unfolded.

7. The air bag apparatus of claim 6, wherein the controller controls the active vent to open while a vehicle velocity is equal to or more than a reference vehicle velocity.

8. The air bag apparatus of claim 1, wherein the controller is an air bag control unit, and
    the air bag control unit controls all air bags within the vehicle to be simultaneously deployed when the main tube is unfolded.

9. An air bag apparatus for a vehicle, the air bag apparatus comprising:
    an inflator;
    a main tube configured to be unfolded toward an occupant of the vehicle by a gas pressure when the inflator explodes;
    a support tube coupled to one side of the main tube and configured to be unfolded by being supplied with gas from the main tube;
    an active vent configured to be installed in a path which connects the main tube to the support tube and to open and close the path;
    a controller configured to control an opening and closing operation of the active vent,
    wherein the opening and closing operation of the active vent depends on a vehicle velocity, and
    wherein the controller controls the active vent not to open when the vehicle velocity is equal to or less than a reference vehicle velocity when the main tube is unfolded.

10. The air bag apparatus of claim 9, wherein the controller controls the active vent not to open whether or not the controller receives a signal from a seat belt sensor that the occupant wears a seat belt.

* * * * *